March 2, 1954 W. R. CROOKS 2,670,594
GAS FUELED SUPERCHARGED FOUR CYCLE ENGINES
Filed July 2, 1949 2 Sheets-Sheet 1
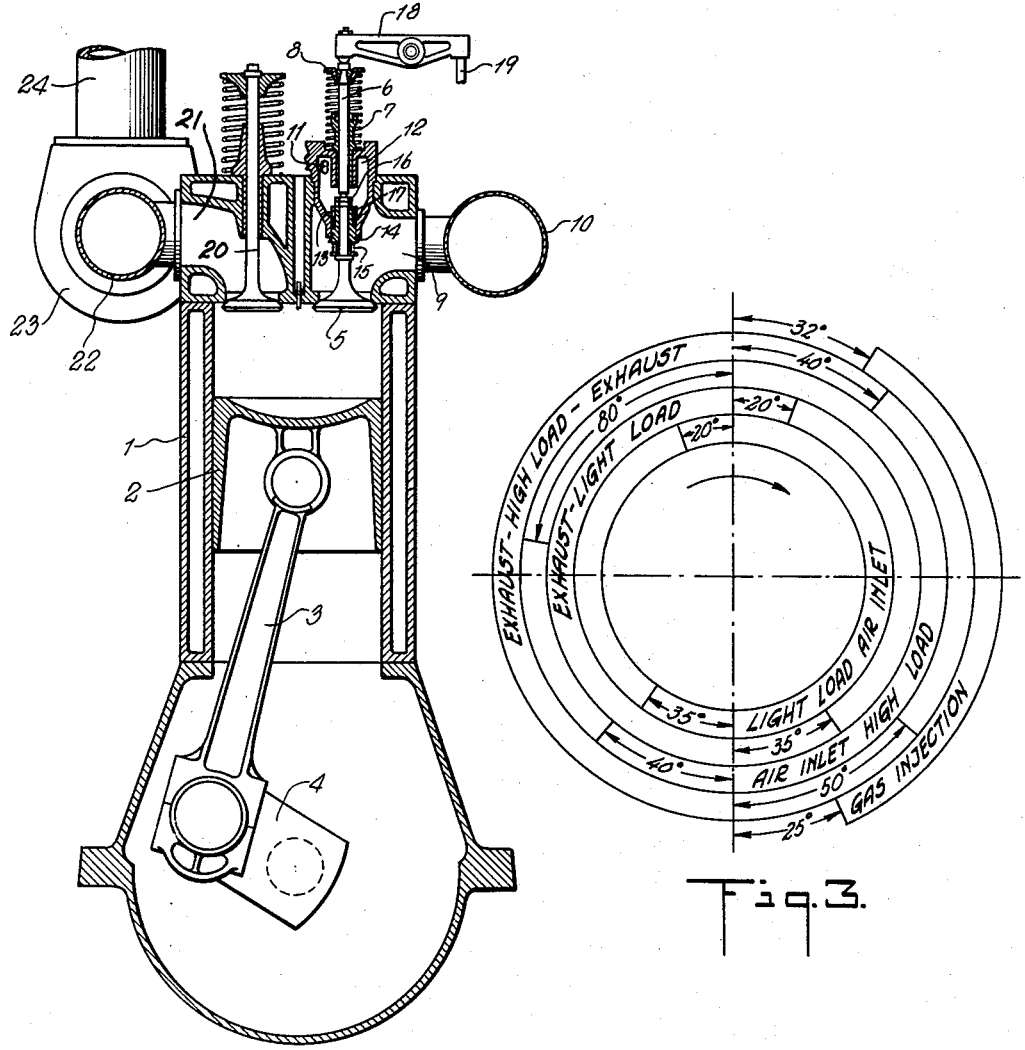
INVENTOR.
WILLIAM R. CROOKS
BY
ATTORNEYS

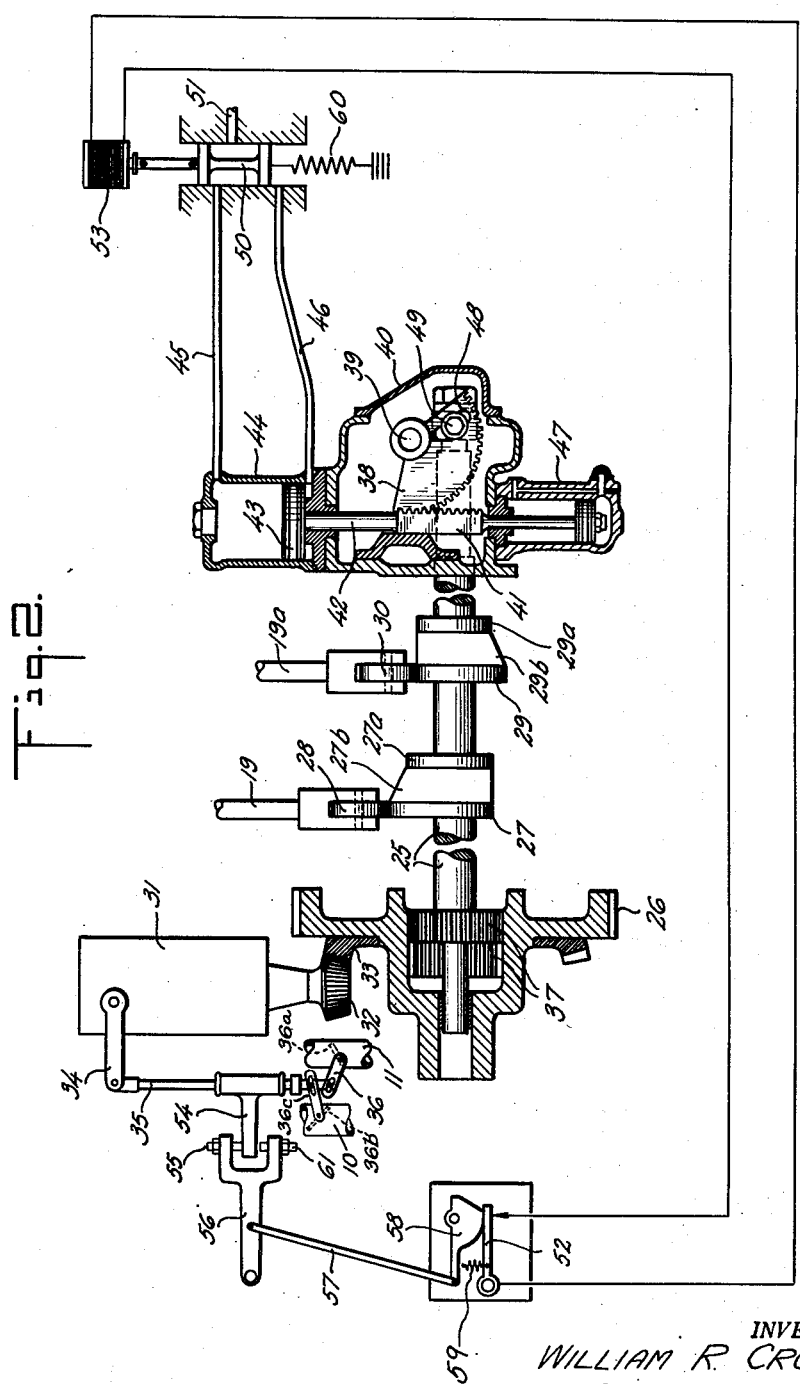

Patented Mar. 2, 1954

2,670,594

UNITED STATES PATENT OFFICE 2,670,594

GAS FUELED SUPERCHARGED FOUR CYCLE ENGINE

William R. Crooks, Mount Vernon, Ohio, assignor to Cooper-Bessemer Corporation, Mount Vernon, Ohio, a corporation of Ohio Application July 2, 1949, Serial No. 102,859

2 Claims. (Cl. 60—13)

The invention relates to four cycle engines powered by gaseous fuels of which natural gas is the most commonly used example, the invention being also useful with other gaseous fuels which behave similarly in engines, such as manufactured and by-product gas, sewer gas, refinery gases of various types.

The invention further relates particularly to four cycle engines powered by fuels of the above character, wherein at loads approaching or equalling full load, supercharging of the air, preferably by the use of an exhaust driven turbo-charger, is used to give a final compression pressure in the neighborhood of 600 lbs. per sq. in., ignition being secured either by injecting oil into the thus compressed mixture, or by electric spark at a voltage of the order of 30,000 to 50,000 volts, assuming a normal spark plug gap. The engine is arranged to produce a gas and air mixture substantially leaner than has heretofore been customary, the gas-to-air ratio ranging between about one to twenty by volume and one to fourteen, at full load, as contrasted to conventional prior practice of about one to ten, using natural gas.

Engines of the above character are prone to operate with poor fuel efficiency and to miss frequently under light loads, and the invention aims primarily to improve the performance of such an engine in the above respects. In accordance with the invention, so long as the engine is operating at or near full load, the operating mechanism of the inlet and exhaust valves is timed to provide a supercharging type of operation, with wide overlap of timing between the inlet and exhaust valves, and this in combination with a higher air manifold pressure results in a final compression pressure of the order above mentioned, under which conditions highly efficient operation will be obtained; but under light load conditions the valve operating mechanism is shifted to markedly reduce the above mentioned wide overlap in the timing of the inlet and exhaust valves, down to a point where their relative timing is substantially the same as would be the case with a high compression engine of the above character receiving air at atmospheric pressure, i. e. with little or no overlap between the valves. In this way it is found that such an engine will operate with satisfactory fuel economy and with little or no missing, under light loads as well as higher loads. For example, the inlet and exhaust valves may be provided with alternative sets of operating cams which, as the load changes are shifted automatically by the governor between active and inactive positions, in such manner that when the load increases from a low value to about 80% of full load, the set of cams will come into operation which produces the supercharging type of operation above referred to; as the load decreases this set of cams may stay in operation until the load is reduced to a much lower point, say 40% of full load, at which time the cams are shifted to throw into operation the "atmospheric" set of cams above referred to. To avoid hunting under intermediate loads, this latter set of cams may stay in operation until the load reaches 80% of full load, as above referred to. It is found that with the above type of control, the operation of the engine is very smooth, making it impossible to tell by the performance of the engine when the shift of the valve operating mechanism takes place, and operation is efficient and reliable at all loads.

In the drawings—

Fig. 1 is a central longitudinal section through a cylinder of an engine constructed to operate in accordance with the invention, and having an exhaust gas driven supercharger associated therewith.

Fig. 2 is a schematic view partly in section, illustrating a mechanism for adjusting or regulating the valve operating mechanisms to cause the engine to operate in accordance with the invention.

Fig. 3 is a timing diagram illustrating the timing of the valves respectively under high load and light load operating conditions.

The invention is illustrated as applied to a four cycle engine powered by gaseous fuel of the type above described, and having a cylinder 1 within which operates in the usual manner a piston 2 connected by a connecting rod 3 to a crank shaft 4. A main inlet valve 5, having a stem 6, and which is urged toward seated position by a spring 7 engaging against a collar 8 at the upper end of the valve stem, controls the admission from a chamber 9 which is connected to the air supply conduit 10. As later described in more detail, the air supply conduit 10 receives air under pressure from a supercharger, and valve 5 is timed to open and close as hereinafter described, by appropriate actuating mechanism. The gaseous fuel is supplied under pressure from a supply line 11, with which a chamber 12 surrounding the valve stem 6, is in communication. An annular gas valve 13 surrounding the valve stem 6 controls communication between the chambers 12 and 9, and when the main valve 5 is in closed position, the head 14 of the gas valve is urged into positive engagement with its seat by a spring 15, thus sealing the gas effectively against admission into chamber 9. After valve 5 starts to open, a collar 16 on the valve stem 6 engages the valve member 13 to move the latter toward open position along with valve 5, but the gas does not flow into chamber 9 until longitudinal passageways 17 in valve member 13 have moved downwardly past the seat of valve head 14. The operating mechanism for the inlet valve is indicated as including a rocker arm 18 actuated by a rod 19. The exhaust valve 20 may be understood as having a similar operating mechanism which is not illustrated in detail beyond the rod 19a (Fig. 2) similar to the rod 19 previously mentioned.

A supercharged, lean mixture of the character previously described is introduced into the cylinder, and as previously stated, the engine is constructed to produce at full load a compression pressure of the order of 600 p. s. i. whereupon the the mixture is ignited as previously described.

Fig. 1 shows the exhaust gases as being conducted through an exhaust gas passageway 21, which communicates with an exhaust gas conduit 22 leading to an exhaust gas driven supercharger indicated generally at 23, it being understood that the air under pressure from the supercharger is delivered into the air intake conduit 10 previously mentioned.

The inlet and exhaust valve operating mechanisms are shown as actuated by a cam shaft 25 (Fig. 2) which will be understood as rotated in timed relation to the engine by a drive gear 26. When the engine is operating under light load conditions, the rod 19 of the inlet valve operating mechanism is actuated by a cam 27 on shaft 25, with which cam a roller 28 on the adjacent end of rod 19 engages. Likewise under light load conditions, the rod 19a of the exhaust valve operating mechanism is actuated by a cam 29 on shaft 25, with which cam a roller 30 on the adjacent end of rod 19a engages.

Under higher load conditions as above referred to, the inlet valve operating rod 19 will be actuated by a cam 27a instead of the cam 27, and the exhaust valve operating rod 19a will be actuated by a cam 29a instead of the cam 29, the cam shaft 25 being shifted endwise as needed to place the two sets of cams alternatively in active position.

Fig. 3 shows typical examples of the timings of the valves under the above mentioned different load conditions. As shown, the period of gas injection may be held constant, it being understood that the gas supply is throttled at lighter loads as hereinafter mentioned, the gas admission beginning after top dead center and closing before bottom dead center. It will be noted however that at higher loads, the air admission begins about 80° prior to top dead center and continues until about 40° after bottom dead center, whereas the exhaust valve opens about 50° prior to bottom dead center, thus providing a relatively long period of overlap during which the air inlet and exhaust valves are both open, this timing being produced by the cams 27a and 29a. This timing of the valves produces a full supercharging effect, which will result in satisfactory and efficient operation at higher loads, but not at lower loads.

Under light load operating conditions where the cams 27 and 29 are active, it will be noted that air admission begins much later, i. e. close to top dead center, and the period of overlap between the inlet and exhaust valves is relatively small, i. e. with little or no overlap. This timing of the valves, it has been found, markedly improves the fuel economy of such an engine, and substantially eliminates missing, at lighter loads.

In the form of mechanism shown in Fig. 2, the valve actuating cams are controlled by the engine governor 31 which is driven by gears 32 and 33, and provided with a lever 34 which rocks under variations in load, and has connected thereto a rod 35. The rod 35 is shown as connected to an arm 36 which controls a suitable valve 36a for throttling the gas coming in through fuel supply conduit 11 upon decrease in load. A similar governor controlled throttle valve 36b, connected to an arm 36c, may be understood as used to throttle the air supplied through conduit 10, upon decrease in load.

The cam shaft 25 is mounted for endwise or axial movement with respect to its driving gear 26, with appropriate splined connecting devices 37 for rotating the cam shaft from the gear, and axial movement of shaft 25 is produced by a sector gear 38 pivoted on a spindle 39 in a supporting housing 40, and driven by a rack 41 carried by a plunger 42, the position of this plunger being controlled by a piston 43 working in a cylinder 44 having compressed air pipes 45 and 46 leading to opposite sides of the piston 43. An appropriate dash pot device 47 of the hydrostatic type may also be provided for the plunger 42. The sector gear 38 has a slot 48 in which engages a pin 49 journaled on cam shaft 25 and thus the position of piston 43 in cylinder 44 controls the axial position of cam shaft 25, and therefore determines which of the alternative sets of valve actuating cams 27, 29 and 27a, 29a, will be in active position.

The postion of the piston 43 in cylinder 44 is in turn controlled by a pilot valve member 50 which selectively connects one of the pipes 45, 46 to a compressed air supply conduit 51, and vents the other pipe. So long as the switch arm 52 in a circuit leading to the solenoid 53 is closed, the solenoid 53 holds the pilot valve 50 in the position shown in Fig. 2, wherein the "light load" set of cams 27 and 29 is in active position. This will be the case so long as light load conditions persist, but upon increase in the load say to 80% of full load, the lever 34 of the governor will swing upwardly sufficiently for a finger 54 on rod 35 to engage a stop 55 carried by a pivoted arm 56, and swing arm 56 upwardly as the parts appear in Fig. 2. Thereupon a link 57 connected to the arm 56 will turn the cam member 58 shown at the left of Fig. 2, sufficiently to enable the spring 59 to move the switch 52 to open circuit position. Then the spring 60 (shown at the right of Fig. 2) will shift the pilot valve 50 downwardly from the position shown in Fig. 2, whereupon cam shaft 25 will be moved axially until the high load cams 27a and 29a come into active position. These cams may remain in active position until the load is reduced to a much lower point, say 40% of full load, whereupon the finger 54 will have moved far enough downwardly to engage a stop 61 carried by the pivoted arm 56, and the resulting downward movement of this arm will thereupon shift the cam member 58 into the position shown in Fig. 2, moving switch 52 to closed circuit position, and thereby causing the "light load" valve actuating cams 27 and 29 to come into the active positions shown in Fig. 2. Ramps 27b and 29b of configuration which merges between the configurations of the two sets of valve operating cams, may be provided to ease the cam shifting operations above referred to.

It may be seen from a consideration of the above that since the final pressure is determined by the amount of gas and air introduced into the cylinder before the piston reaches top dead center and the pressure under which the gas and air are introduced, other factors remaining constant, the final pressure is effected by controlling the timing of the valves and the pressure of the air and gas introduced into the cylinder. As pointed out above, the engine governor 31 controls throttle valves in the gas and air supply lines which means that as the load decreases the gas and air pressures in the conduits 11 and 10 decrease and vice versa. Furthermore, the timing of the valves is related to the gas and air pressures in the conduit in such a manner that the decreases in pressures are not offset by increases in volumes of the gas and air introduced into the cylinder and vice versa, and the exhaust valve is closed earlier under light-load conditions (when the air pressure is low) to prevent hot exhaust gas from being drawn back into the cylinder from the exhaust manifold and hence spoiling the gas-air mixture.

In addition, when the load conditions are high, a large amount of air must be flushed through the cylinder to cool the exhaust gases to a temperature low enough to permit the use of an exhaust gas driven supercharger, and for this reason the valve timing is adjusted at high loads to provide a large overlap of the end of the exhaust open period and the beginning of the air inlet period. If this were not done, exhaust gas temperature would be too great for the material used in the construction of the supercharger.

Thus in the form of the invention above described, it will be noted that although the gas and air supplies are throttled proportional to the load, at all intermediate loads, the shift from the light load cams to the high load cams takes place at a relatively high load, upon increase in load; but that upon decrease in load, the shift back to the light load cams, does not occur until a substantially lower load has been reached. This arrangement avoids unduly frequent shifting between the two sets of valve actuating cams, at intermediate loads.

While the invention has been disclosed as carried out by the specific apparatus above described, it should be understood that changes may be made therein without departing from the invention in its broader aspects, within the scope of the appended claims.

I claim:

1. A gas fueled, high compression, four cycle engine having a cylinder and inlet and exhaust valves, a supercharger communicating with the inlet valve to deliver air under pressure thereto and communicating with the exhaust valve to receive the exhaust gases from said cylinder, said supercharger being powered by said exhaust gases, means for controlling the pressure of the air supplied to said inlet valve, variable valve operating mechanism connected to said valves, said mechanism being adapted to vary the lengths of time said valves are open and closed, and a governor operated by said engine and connected to said means for controlling the pressure of the air supplied to said inlet valve and to said valve operating mechanism, said governor being responsive to engine load conditions for varying said valve operating mechanism in accordance therewith and for decreasing the pressure of the air supplied to said inlet valve and for decreasing the overlap between the open periods of said valves in response to decreases in load on said engine and vice versa, whereby under heavy loads compression pressures of the order of 600 p. s. i. and gas to air ratios in the range from one to fourteen to one to twenty are obtained and the amount of cooling air mixed with the exhaust gases is increased over that at light loads and largely eliminate the supercharging effect under light load conditions.

2. A gas fueled, high compression, four cycle engine having a cylinder and inlet and exhaust valves, a supercharger communicating with the inlet valve to deliver air under pressure thereto and communicating with the exhaust valve to receive the exhaust gases from said cylinder, said supercharger being powered by said exhaust gases, a gaseous fuel supply conduit communicating with said inlet valve, means for controlling the pressure of the air and gas supplied to said inlet valve, variable valve operating mechanism connected to said valves, said mechanism being adapted to vary the lengths of time said valves are open and closed, and a governor operated by said engine and connected to said means for controlling the pressure of the air and gas supplied to said inlet valve and to said valve operating mechanism, said governor being responsive to engine load conditions for varying said valve operating mechanism in accordance therewith and for decreasing the pressure of the air and gas supplied to said inlet valve and for decreasing the overlap between the open times of said valves in response to decreases in load on said engine and vice versa, whereby under heavy loads compression pressures of the order of 600 p. s. i. and gas to air ratios in the range from one to fourteen to one to twenty are obtained and the amount of cooling air mixed with the exhaust gases is increased over that at light loads and largely eliminate the supercharging effect under light load conditions.

WILLIAM R. CROOKS.

References Cited in the file of this patent

UNITED STATES PATENTS

| Number | Name | Date |
|---|---|---|
| 1,445,653 | Watson | Feb. 20, 1923 |
| 1,688,164 | Tarrant | Oct. 16, 1928 |
| 1,863,875 | Rabezzana | June 21, 1932 |
| 1,910,279 | Büchi | May 23, 1933 |
| 2,060,580 | La Chapelle | Nov. 10, 1936 |
| 2,198,516 | Schütte | Apr. 23, 1940 |
| 2,375,071 | Boyer | May 1, 1945 |
| 2,397,511 | Schreck | Apr. 2, 1946 |
| 2,509,960 | Calhoun | May 30, 1950 |

FOREIGN PATENTS

| Number | Country | Date |
|---|---|---|
| 552,053 | France | Jan. 17, 1923 |